United States Patent [19]

Kryscyk

[11] Patent Number: 4,472,154
[45] Date of Patent: Sep. 18, 1984

[54] DRIVE ARRANGEMENT FOR TRANSFERRING TORQUE BETWEEN TWO NON-ALIGNED SHAFTS

[75] Inventor: Robert Kryscyk, Ketsch, Fed. Rep. of Germany

[73] Assignee: Deere & Company, Moline, Ill.

[21] Appl. No.: 457,839

[22] Filed: Jan. 14, 1983

[30] Foreign Application Priority Data

Jan. 20, 1982 [EP] European Pat. Off. ......... 82300284.5

[51] Int. Cl.³ .......................... F16D 3/04; F16D 3/50
[52] U.S. Cl. ..................................... 464/73; 464/104; 464/149; 464/154
[58] Field of Search ..................................... 464/73–75, 464/102, 104, 147, 149, 153–156

[56] References Cited

U.S. PATENT DOCUMENTS

| | | | |
|---|---|---|---|
| 1,561,476 | 11/1925 | Masury et al. | 464/74 |
| 2,074,940 | 3/1937 | Ricefield | 464/149 X |
| 2,157,996 | 5/1939 | Brownstein | 464/149 X |
| 2,200,641 | 5/1940 | Ricefield | 464/149 X |
| 2,219,144 | 10/1940 | Williams | 464/149 X |
| 2,502,790 | 4/1950 | Jencick | 464/73 |
| 2,616,273 | 11/1952 | Pringle | 464/73 |
| 3,485,062 | 12/1969 | Blake | 464/149 X |

FOREIGN PATENT DOCUMENTS

| | | |
|---|---|---|
| 2095646 | 1/1972 | France . |
| 566083 | 12/1944 | United Kingdom . |
| 731081 | 1/1955 | United Kingdom . |
| 832092 | 4/1960 | United Kingdom . |
| 858768 | 1/1961 | United Kingdom . |
| 1178156 | 1/1970 | United Kingdom . |
| 1286476 | 8/1972 | United Kingdom . |

Primary Examiner—John Petrakes

[57] ABSTRACT

A drive arrangement is disclosed which provides for the transfer of torque between two non-aligned shafts. The drive arrangement includes an intermediate shaft having outwardly projecting claws secured to each end thereof which are engageable in a positive driving manner with corresponding claws formed on the first and second shafts, respectively. A pair of resilient members are interposed between the claws at each end of the intermediate shaft which provide flexible couplings for facilitating the transfer of torque therebetween. Such a drive arrangement corrects for pure eccentricity between the parallel axes of the first and second shafts as well as correcting for any lack of parallelism between these axes.

11 Claims, 2 Drawing Figures

DRIVE ARRANGEMENT FOR TRANSFERRING TORQUE BETWEEN TWO NON-ALIGNED SHAFTS

FIELD OF THE INVENTION

This invention relates to a drive arrangement for transferring torque between two non-aligned shafts, and more particularly to a drive arrangement for transferring torque between a motor and a hydraulic pump wherein the connecting shafts are misaligned.

BACKGROUND OF THE INVENTION

Currently there are many types of couplers and joints available for connecting two non-aligned shafts. For example, in the transmission of automobiles, universal joints of the Hooke or Cardan type are employed. Such joints are relatively complex, require precision engineering structures and due to their high costs, can only be employed where the need justifies the expense. Moreover, such joints require a fair amount of space for their installation because an adequate gap must be maintained between the first and second shafts.

Currently there is a need for a considerably simpler, cheaper and more compact arrangement which is especially useful when the degree of potential misalignment is slight. One example of where such a drive arrangement would be useful is between the engine and hydraulic pump on an agricultural or industrial type vehicle. Today, it is common practice to bolt the pump to the engine by providing machined mating parts which enables precise positioning. In such construction, the axes of the shafts can be exactly aligned and directly coupled via a tongue and slot arrangement. The attachment of the hydraulic pump to the motor would be much more convenient if the two units could be independently mounted to the chassis or frame of the vehicle. However, when this is done, it is impossible to ensure alignment between the shafts because the chassis is not an article of precision engineering and because the customary use of resilient mountings for the engines tend to create misalignment. This alternative approach will only therefore be feasible if a suitable inexpensive drive arrangement of the aforementioned type is made available. Another problem which arises in driving units, such as multiple-piston hydraulic pumps, is that their reaction torque is not steady but instead pulsates. It is therefore desirable to provide a drive arrangement which not only corrects for any misalignment between the shafts but which also has shock absorbing properties to absorb the torque peaks as well as the eccentric forces arising from the non-alignment of the shafts.

Now a drive arrangement has been invented which will satisfy the above-mentioned problems.

SUMMARY OF THE INVENTION

Briefly, this invention relates to a drive arrangement for transferring torque between two non-aligned shafts. The drive arrangement includes an intermediate shaft having outwardly projection claws secured to each end thereof which are engageable in a positive driving manner with corresponding claws formed on the first and second shafts, respectively. A pair of resiliently compressible members, which are constructed of an elastic material, are interposed between the claws at each end of the intermediate shaft. The resilient members provide flexible couplings which facilitate the transfer of torque between the first and second shafts. This drive arrangement corrects for misalignment due to pure eccentricity between parallely aligned shafts as well as for shafts having axes which lack parallelism.

The general object of this invention is to provide a drive arrangement for transferring torque between two non-aligned shafts. A more specific object of this invention is to provide a drive arrangement for transferring torque between the output shaft of an engine and the input shaft of a hydraulic pump.

Another object of this invention is to provide a simple and inexpensive drive arrangement for transferring torque between two misaligned shafts.

Still another object of this invention is to provide a drive arrangement for transferring torque between two non-aligned shafts and also for providing shock absorbing properties should torque peaks arise between the two non-aligned shafts.

Still further, an object of this invention is to provide a drive arrangement for transferring torque between two non-aligned shafts when the lack of alignment is due to eccentricity between the parallel axes of the two shafts or when there may be a lack of parallelism between the axes.

Still further, an object of this invention is to provide a compact drive arrangement for transferring torque between two non-aligned shafts.

Other objects and advantages of the present invention will become more apparent to those skilled in the art in view of the following description and the accompanying drawings.

DETAILED DESCRIPTION OF THE PREFERRED EMBODIMENT

Figure 1:
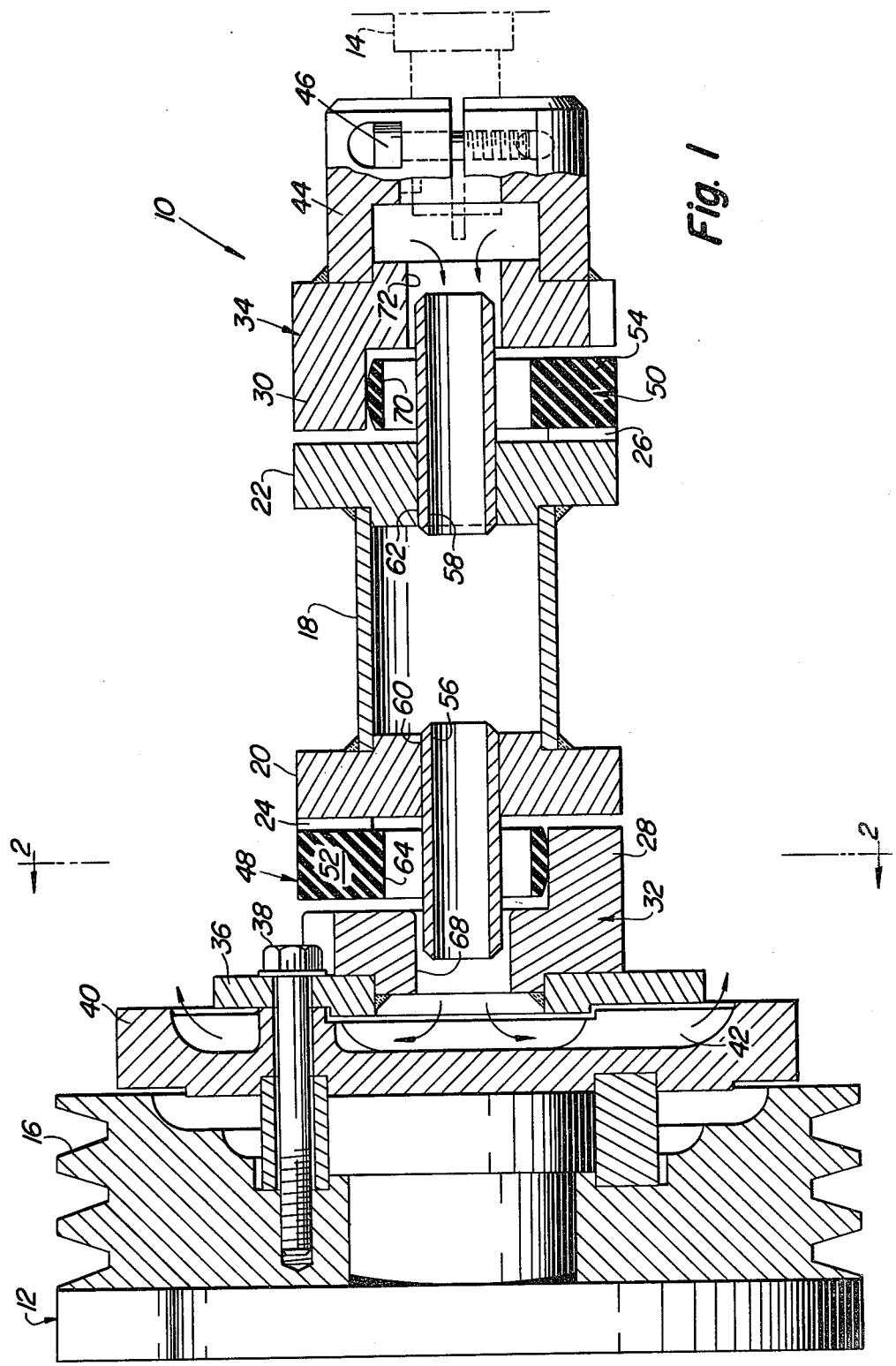
FIG. 1 is a cross-sectional view of the drive arrangement taken along the line 1—1 of FIG. 2.

Referring to FIG. 1, a drive arrangement 10 is shown which enables a first shaft 12 to be connected to a second shaft 14. Typically, such a connection is needed between the output shaft of an engine and the input shaft to a hydraulic pump. The first shaft 12 can be the engine drive shaft and is represented as having a belt drive pulley 16 secured to it such that it can drive an auxiliary piece of equipment such as a cooling fan. An intermediate shaft 18, preferably a hollow shaft, is coupled between the first and second shafts 12 and 14 so as to facilitate the transfer of torque therebetween. Secured to the left and right ends of the intermediate shaft 18, such as by welding, are circular flanges 20 and 22, respectively. Each flange 20 and 22 has one or more outwardly projecting claws 24 and 26, respectively, secured thereto. Preferably there are a plurality of claws spaced an equal distance apart on the outer surface of the flanges 20 and 22. More preferably, there are four outwardly projecting claws 24 positioned 90 degrees apart on the outer surface of the flange 20 and four outwardly projecting claws 26 positioned 90 degrees apart on the outer surface of the flange 22.

The claws 24 and 26 engage in a positive driving manner with corresponding claws 28 and 30 which are formed on claw rings 32 and 34, respectively. The claw ring 32 is secured to a flange 36 which in turn is bolted to the drive belt pulley 16 by bolts 38. In addition, an impeller disk 40 is interposed between the flange 36 and the belt drive pulley 16 and is also secured thereto by the bolts 38. The face of the impeller disk 40 which faces the intermediate flange 18 is recessed and provided with a plurality of vanes 42, see FIGS. 1 and 2. The purpose of the vanes 42 will be explained shortly.

The other claw ring 34, is secured to a split sleeve 14 which encircles an end portion of the second shaft 14. The split sleeve 44 is secured to the second shaft 44 by a binding screw 46 such that as the screw 46 is tightened, it draws the halves of the split sleeve 44 together and clamps them onto the second shaft 14. By loosening the binding screw 46, the split sleeve 44 can be slid along the second shaft 14 away from the intermediate shaft 18. This enables the intermediate shaft 18 to be moved axially to disengage the claws 26 from the claws 30 and to disengage the claws 24 from the claws 28 whereupon the intermediate shaft 18 can be removed. Assembly is equally straight-forward in that the various parts are merely positioned in place and then the split sleeve 44 is slid towards the intermediate shaft 18 such that the claws 26 engage the claws 30. The binding screw 46 is then tightened and the drive arrangement 10 is assembled such that the intermediate shaft 18 is mounted in a floating manner between the first and second shafts 12 and 14, respectively.

Figure 2:
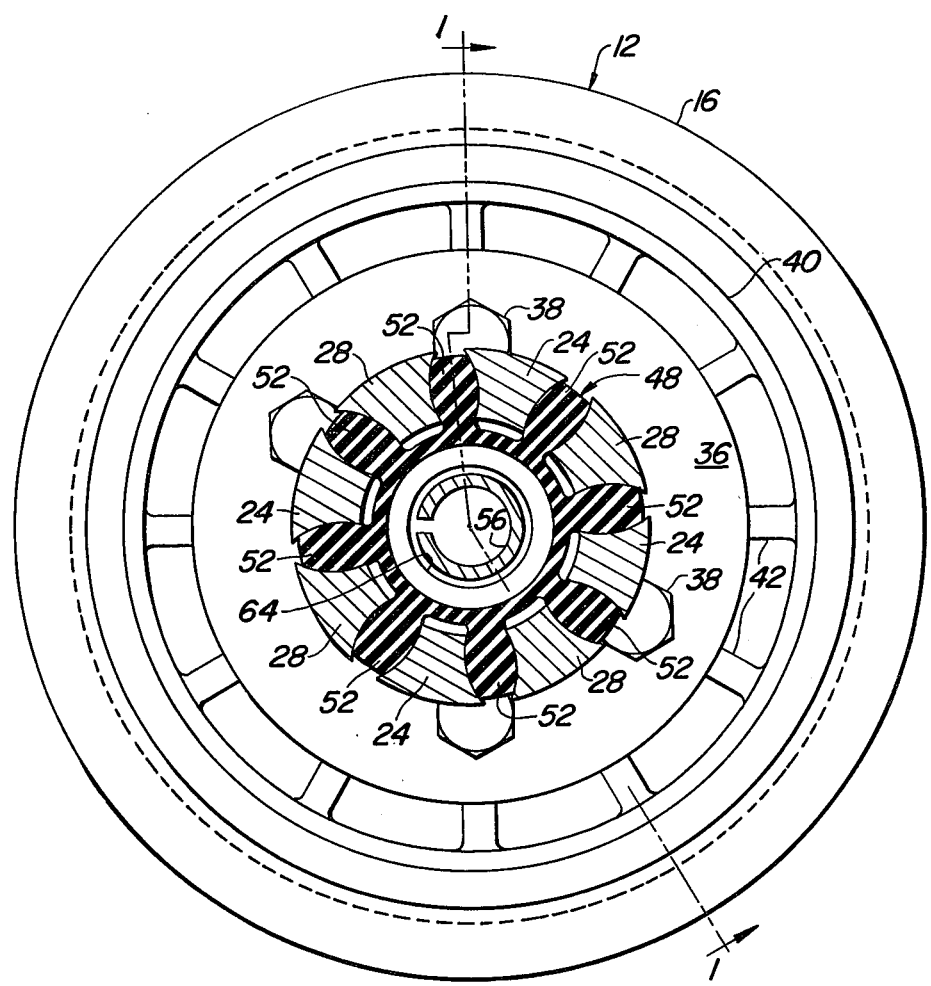
FIG. 2 is an axial section of the drive arrangement taken along the line 2—2 of FIG. 1.

Referring to both FIGS. 1 and 2, one will notice that resilient members 48 and 50, which are constructed of a compressible elastomeric material, are interposed between the claws 24 and 28 and the claws 26 and 30, respectively. Preferably, each resilient member, 48 and 50, is a circular ring having radially projecting outward teeth 52 and 54, respectively. The teeth 52 and 54 have a convex spherical profile on each flank and are designed to cooperate with a complimentary concave profile formed on the claws 24 and 28 and 26 and 30. This design enables driving engagement to be maintained when the axes of the coupled shafts 12, 14 and 18 are slightly misaligned as well as holding the intermediate shaft 18 in position such that the claws 24 and 26 engage the claws 28 and 30, respectively.

For simplifying the assembly of the driving arrangement 10, the intermediate shaft 18 can be floatably mounted between the first and second shafts 12 and 14. By floatably mounted, it is meant that the intermediate shaft 18 can tilt or bend relative to the end face of the first and second shafts 12 and 14. As a safety precaution against inadvertent disengagement should excessive eccentric forces occur, hollow axial pins 56 and 58, preferably having a split sleeve construction, are securely fitted into axial bores 60 and 62 of the flange members 20 and 22, respectively. The pin 56 projects outward through an opening 64 formed in the resilient member 48 and into an oversize bore 68 axially formed in the claw ring 32. Likewise, the pin 58 projects outward through an axial opening 70 formed in the resilient member 50 and projects into an oversize bore 72 axially formed within the claw ring 34. The pins 56 and 58 are so constructed as to contain an outside diameter which is slightly less than the inside diameter of the bores 68 and 72. Under normal conditions, the pins 56 and 58 will not contact the inner walls of the bore 68 and 72 but they will do so should the intermediate shaft 18 move out of alignment with either the first or second shafts 12 and 14, respectively. Once the pins 56 and 58 contact the walls of the bores 68 and 70, further deflection of the intermediate shaft 18 will be restricted.

It should be noted that the resilient members 48 and 50 will generate internal frictional heat during operation and therefore are preferably cooled to avoid deterioration of their material. Such cooling is accomplished by the vanes 42 formed on the impeller disk 40. As the vanes 42 rotate, air is drawn in through the split sleeve 44 and flows through the split pin 58 to the center of the hollow intermediate shaft 18. From here the air passes through the split pin 56 and out of the impeller disk 40 as indicated by the arrows. As the air flow through the pins 56 and 58, the heat generated in the adjacent resilient members 48 and 50 is dissipated.

While the invention has been described in conjunction with a specific embodiment, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

I claim:

1. A drive arrangement for transferring torque between first and second non-aligned shafts, said drive arrangement comprising:
   (a) an intermediate shaft having a flange secured to each end thereof with outwardly projecting claws formed thereon;
   (b) first and second claw rings secured to an end of said first and second shafts respectively, each claw ring having outwardly projecting claws formed thereon which are engageable in a positive driving manner with said claws formed on said flanges, each of said claw rings further having an axial bore formed therein;
   (c) a pair of resilient members each having a centrally aligned opening formed therein which are interposed between said claws at each end of said intermediate shaft, said resilient members creating flexible couplings for facilitating the transfer of torque between said first and second shafts; and
   (d) a pair of pins each secured to one of said flanges and each of which extends through said central opening formed in said adjacent resilient member and into said bore formed in said respective claw ring, said pins having an outside diameter which is less than the inner diameter of said bores thereby restricting the amount of eccentricity permitted between said first and second shafts while assisting in providing engagement of said intermediate shaft to said first and second shafts.

2. The drive arrrangement of claim 1 wherein each of said pins is a hollow split sleeve.

3. The drive arrangement of claim 1 wherein said resilient members are constructed of a compressible elastomeric material.

4. The drive arrangement of claim 1 wherein said intermediate shaft is hollow and means are provided at one end thereof for drawing air through said hollow intermediate shaft to cool said resilient members.

5. A drive arrangement for transferring torque between first and second non-aligned shafts, said drive arrangement comprising:
   (a) a hollow intermediate shaft having a flange secured to each end thereof, said flanges having an axially aligned through bore formed therein and having a plurality of outwardly projecting claws formed thereon;
   (b) first and second claw rings secured to an end of said first and second shafts respectively, each claw ring having a plurality of outwardly projecting claws formed thereon which are engageable in a positive driving manner with said claws formed on said flanges, each of said claw rings further having an axial bore formed therein;

(c) a pair of resilient members each having a centrally aligned opening formed therein which are interposed between said claws at each end of said intermediate shaft, said resilient members creating flexible couplings for facilitating the transfer of torque between said first and second shafts;

(d) a pair of hollow pins each secured in said axial openings of one of said flanges and each of which extends through said central opening formed in said adjacent resilient member and into said bore formed in said respective claw rings, said pins having an outside diameter which is less than the inner diameter of said bores thereby restricting the amount of eccentricity permitted between said first and second shafts while assisting in providing engagement of said intermediate shaft to said first and second shafts; and (e) an impeller disk attached to said first shaft adjacent to said first claw ring, said impeller disk having a plurality of vanes formed thereon which facilitate the movement of air through said hollow pins in hollow intermediate shaft so as to cool said pair of resilient members.

6. A drive arrangement for transferring torque between first and second non-aligned shafts, said drive arrangement comprising:

(a) an intermediate shaft having a flange secured to each end thereof with outwardly projecting claws formed thereon;

(b) first and second rings secured to an end of said first and second shafts respectively, each ring having outwardly projecting claws formed thereon which are engageable in a positive driving manner with said claws formed on said flanges, each of said rings further having a bore formed therein;

(c) a pair of resilient members each having a centrally aligned opening formed therein which are interposed between said claws at each end of said intermediate shaft, said resilient members creating flexible couplings for facilitating the transfer of torque between said first and second shafts; and (d) a pair of pins each positioned in one of said central openings formed in said resilient members and each extending from said adjacent flange into said bore formed in said adjacent ring for limiting the amount of eccentricity therebetween.

7. The drive arrangement of claim 6 wherein each of said resilient members includes a circular ring having a plurality of teeth extending radially outward therefrom, each of said teeth being trapped between a claw of said adjacent flange and a claw formed on said adjacent shaft.

8. The drive arrangement of claim 7 wherein each of said teeth formed on said resilient members has a rounded flank.

9. The drive arrangement of claim 6 wherein each of said claws formed on said first and second rings has a concave surface.

10. The drive arrangement of claim 6 wherein said intermediate shaft is flotatably mounted between said first and second shafts so as to be capable of tilting relative to either shaft.

11. The drive arrangement of claim 6 wherein said resilient members are constructed of a compressible elastomeric material.

* * * * *